United States Patent
Curtis et al.

(10) Patent No.: US 9,813,302 B2
(45) Date of Patent: Nov. 7, 2017

(54) DATA CENTER NETWORKS

(71) Applicant: Tigera, Inc., San Francisco, CA (US)

(72) Inventors: Michael Curtis, San Francisco, CA (US); Christopher Liljenstolpe, San Francisco, CA (US); Alex Pollitt, San Francisco, CA (US); Matthew Gerard Horatio Dupre, Enfield (GB); Edward Peter Harrison, Enfield (GB)

(73) Assignee: Tigera, Inc., San Francisco, CA (US)

( * ) Notice: Subject to any disclaimer, the term of this patent is extended or adjusted under 35 U.S.C. 154(b) by 64 days.

(21) Appl. No.: 14/838,928

(22) Filed: Aug. 28, 2015

(65) Prior Publication Data
US 2017/0063631 A1    Mar. 2, 2017

(51) Int. Cl.
*H04L 12/28* (2006.01)
*H04L 12/24* (2006.01)

(52) U.S. Cl.
CPC .......... *H04L 41/12* (2013.01); *H04L 41/0803* (2013.01)

(58) Field of Classification Search
CPC ...... H04L 45/66; H04L 41/12; H04L 41/0803
USPC ........................................................ 370/254
See application file for complete search history.

(56) References Cited

U.S. PATENT DOCUMENTS

| | | | |
|---|---|---|---|
| 2014/0101302 A1* | 4/2014 | Yang | H04L 41/0813 709/224 |
| 2014/0101336 A1* | 4/2014 | Yang | H04L 45/02 709/244 |
| 2015/0043581 A1* | 2/2015 | Devireddy | H04L 49/70 370/392 |
| 2015/0071286 A1* | 3/2015 | de Silva | H04L 45/586 370/392 |
| 2015/0312153 A1* | 10/2015 | Venkataswami | H04L 47/125 370/235 |
| 2016/0020921 A1* | 1/2016 | Tsai | H04L 12/467 370/254 |
| 2016/0316005 A1* | 10/2016 | Thirumurthi | H04L 67/1008 |
| 2017/0026461 A1* | 1/2017 | Boutros | H04L 67/101 |

OTHER PUBLICATIONS

Andreyev: "Introducing data center fabric, the next-generation Facebook data center network", INFRA Networking and Traffic, Nov. 14, 2014, 13 pages.

* cited by examiner

*Primary Examiner* — Faisal Choudhury
(74) *Attorney, Agent, or Firm* — Van Pelt, Yi & James LLP

(57) ABSTRACT

Measures, including systems, methods and non-transitory computer-readable storage mediums, for use in operating a data center network, the data center network including an interconnect fabric including a plurality of spine switches, a plurality of top-of-rack switches and a plurality of compute servers. The interconnect fabric is configured to implement a plurality of independent spine switch planes. Each spine switch plane in the plurality of independent spine switch planes includes a different spine switch in the plurality of spine switches. The configuring includes configuring Layer 2 networking within each independent spine switch plane in the plurality of independent spine switch planes.

18 Claims, 2 Drawing Sheets

DATA CENTER NETWORKS

BACKGROUND OF THE INVENTION

Field of the Invention

The present disclosure relates to data center networks. In particular, but not exclusively, the present disclosure relates to measures, including methods, systems and computer program products, for use in operating data center networks.

Description of the Related Technology

Consider the network architecture of a data center with virtual workloads (for example Virtual Machines, Linux Containers, etc.). A known topology is leaf-and-spine (also called a Clos network after Charles Cls), where each spine (or 'end-of-row') switch connects to each leaf switch, but leaf switches do not connect to one another, nor do spine switches connect to one another. Compute servers (or 'hosts' or 'compute hosts') for the virtual workloads only connect to leaf switches, as shown in the known data center network 100 of FIG. 1.

Features of this architecture include increased cross-connect bandwidth in the network for each additional spine switch, as well as redundancy against spine switch failures. Using Ethernet switches for the leaf and spine switches in this architecture can be problematic, however, because Ethernet does not tolerate loops in the topology. Running standard Spanning Tree Protocol (STP) on this topology will result in all but one of the spine switches being isolated.

Proprietary, vendor-specific systems exist, such as Multichassis Link Aggregation (MLAG), in which the spine switches are interconnected on a management network and exchange messages to allow them to present themselves as a single distributed switch to the leaves via Link Aggregation Control Protocol (LACP); thus the leaves can operate as if they have a single logical interface into the data center fabric.

Another method is to use Layer 3 networking approaches in order to enable the use of Layer 3 approaches. However, if Layer 3 technology is used to enable the compute servers to advertise their occupants, for example as described in U.S. patent application Ser. No. 14/231,616, the entirety of which is hereby incorporated by reference, there will be many more routes to be stored by each top-of-rack (or 'leaf') switch; this may exceed the route table capacity for these switches.

It would be desirable to have a solution to the above problems, for example one that employs open, industry standard protocols and which is easier to provision and diagnose.

SUMMARY

According to first embodiments, there is a system for use in operating a data center network, the data center network comprising an interconnect fabric comprising:
a plurality of spine switches;
a plurality of top-of-rack switches; and
a plurality of compute servers,
the system comprising at least one memory including computer program code; and
at least one processor in data communication with the at least one memory, wherein the at least one processor is configured to implement a plurality of independent spine switch planes, wherein each spine switch plane in the plurality of independent spine switch planes comprises a different spine switch in the plurality of spine switches,
wherein the configuring comprises configuring Layer 2 networking within each independent spine switch plane in the plurality of independent spine switch planes.

According to second embodiments, there is a method for use in operating a data center network, the data center network comprising an interconnect fabric comprising:
a plurality of spine switches;
a plurality of top-of-rack switches; and
a plurality of compute servers,
the method comprising configuring the interconnect fabric to implement a plurality of independent spine switch planes, wherein each spine switch plane in the plurality of independent spine switch planes comprises a different spine switch in the plurality of spine switches,
wherein the configuring comprises configuring Layer 2 networking within each independent spine switch plane in the plurality of independent spine switch planes.

According to third embodiments, there is a non-transitory computer-readable storage medium comprising computer-executable instructions which, when executed by a processor, cause a computing device to perform a method for use in operating a data center network, the data center network comprising an interconnect fabric comprising:
a plurality of spine switches;
a plurality of top-of-rack switches; and
a plurality of compute servers,
the method comprising configuring the interconnect fabric to implement a plurality of independent spine switch planes, wherein each spine switch plane in the plurality of independent spine switch planes comprises a different spine switch in the plurality of spine switches,
wherein the configuring comprises configuring Layer 2 networking within each independent spine switch plane in the plurality of independent spine switch planes.

According to fourth embodiments, there is a system for use in operating a data center network, the data center network comprising an interconnect fabric comprising:
a plurality of spine switches;
a plurality of top-of-rack switches; and
a plurality of compute servers,
the system comprising at least one memory including computer program code; and
at least one processor in data communication with the at least one memory, wherein the at least one processor is configured to implement a plurality of independent spine switch planes, wherein each spine switch plane in the plurality of independent spine switch planes comprises a different spine switch in the plurality of spine switches,
wherein the configured interconnect fabric comprises a physical connection from each spine switch in the plurality of spine switches to each top-of-rack-switch in the plurality of top-of-rack-switches,
wherein the configuring comprises segmenting each top-of rack switch in the plurality of top-of-rack switches into a plurality of virtual local area networks (VLANs), each VLAN in the plurality of VLANs being associated with a different independent spine switch plane,
wherein the configured interconnect fabric comprises a physical connection from each compute server in the plurality of compute servers to a single top-of-rack-switch in the plurality of top-of-rack-switches, the physical connection from a respective computer server to a respective single top-of-rack-switch being configured to connect logically to each VLAN configured on the respective single top-of-rack switch, and wherein the configuring comprises configuring Layer 2 networking within each independent spine switch plane in the plurality of independent spine switch planes.

Further features of the present disclosure will become apparent from the following description of preferred embodiments, given by way of example only, which is made with reference to the accompanying drawings.

DETAILED DESCRIPTION OF CERTAIN INVENTIVE EMBODIMENTS

Figure 1:
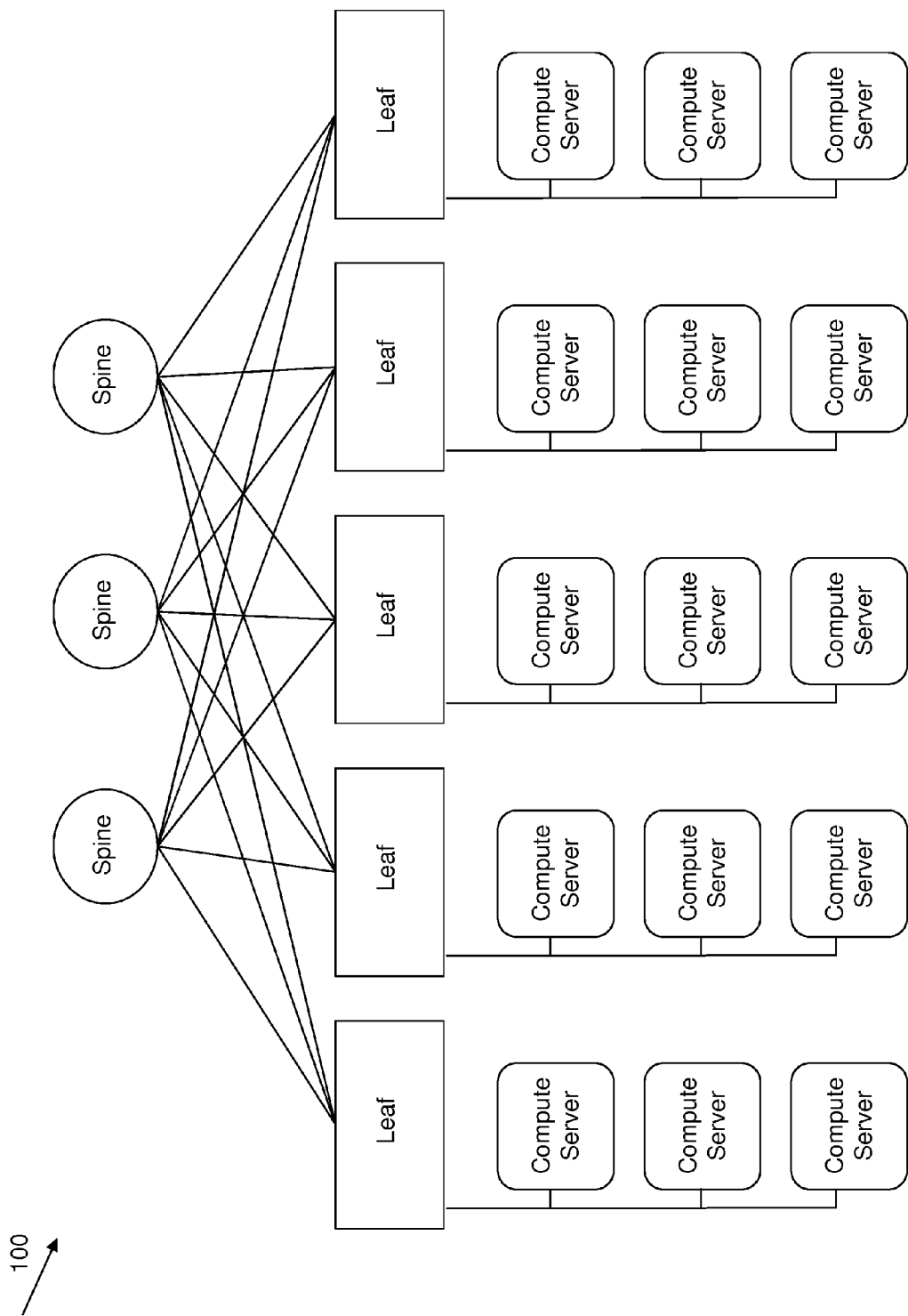
FIG. 1 shows a system diagram according to the prior art.
Figure 2:
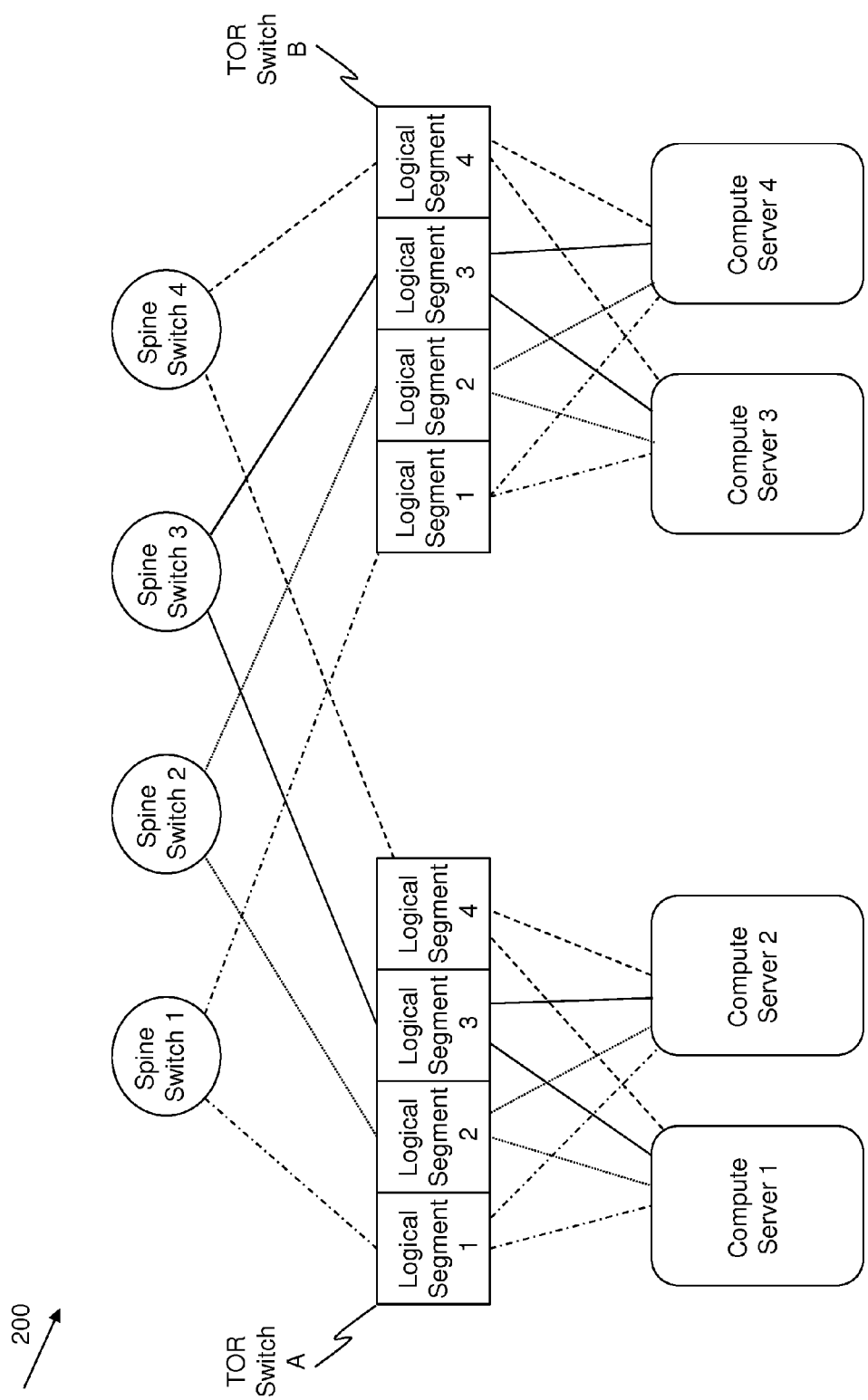
FIG. 2 shows a system diagram according to one or more embodiments of the present invention.

FIG. 2 shows a system diagram according to embodiments. FIG. 2 depicts a data center network 200 comprising a plurality of spine switches, a plurality of top-of-rack switches, a plurality of compute servers and an interconnect fabric. A plurality of end points (or 'guests') can connect to the data center network to be provided with various data processing tasks.

In the example embodiments of FIG. 2, the plurality of spine switches comprises four spine switches, namely spine switch 1, spine switch 2, spine switch 3 and spine switch 4. In the example embodiments of FIG. 2, the plurality of top-of-rack switches comprises two top-of-rack switches, namely top-of-rack (TOR) switch A and top-of-rack switch B. In the example embodiments of FIG. 2, the plurality of compute servers comprises four compute servers, namely compute server 1, compute server 2, compute server 3 and compute server 4. In practice, the number of spine switches, top-of-rack switches and/or compute servers can differ from the examples depicted in FIG. 2 according to embodiments. The interconnect fabric (or 'switching fabric') of embodiments interconnects one or more of the switches and compute servers in data center network 200 and will be described in more detail below.

Embodiments comprise measures, including methods, systems (or 'apparatus') and computer program products (such as non-transitory computer-readable storage mediums), for use in operating data center networks. A data center network 200 comprises an interconnect fabric comprising a plurality of spine switches, a plurality of top-of-rack switches and a plurality of compute servers. The interconnect fabric is configured to implement a plurality of independent spine switch planes. Each spine switch plane in the plurality of independent spine switch planes comprises a different spine switch in the plurality of spine switches. The configuring comprises configuring Layer 2 networking within each independent spine switch plane in the plurality of independent spine switch planes. The term 'Layer 2' here refers to the data link layer of the Open Systems Interconnection (OSI) model.

In embodiments, each independent spine switch plane comprises a single, dedicated spine switch. A spine switch can commonly be a bottleneck in a data center network, so having a spine switch dedicated to each independent spine switch can help to avoid/ameliorate such bottlenecks.

In the example embodiments depicted in FIG. 2, spine switch 1 forms a first independent spine switch plane and the interconnections between the various components/entities of the first independent spine switch plane are shown with a dash-dotted line. In the example embodiments depicted in FIG. 2, spine switch 2 forms a second independent spine switch plane and the interconnections between the various components/entities of the second independent spine switch plane are shown with a dotted line. In the example embodiments depicted in FIG. 2, spine switch 3 forms a third independent spine switch plane and the interconnections between the various components/entities of the third independent spine switch plane are shown with a solid line. In the embodiments depicted in FIG. 2, spine switch 4 forms a fourth independent spine switch plane and the interconnections between the various components/entities of the fourth independent spine switch plane are shown with a dashed line.

In embodiments, configuring the interconnect fabric to implement a plurality of independent spine switch planes comprises connecting the spine switch of each independent spine switch plane to each top-of-rack switch in the plurality of top-of rack switches. In the embodiments of FIG. 2, spine switch 1 is connected to TOR switch A and TOR switch B. In the embodiments of FIG. 2, spine switch 2 is connected to TOR switch A and TOR switch B. In the embodiments of FIG. 2, spine switch 3 is connected to TOR switch A and TOR switch B. In the embodiments of FIG. 2, spine switch 4 is connected to TOR switch A and TOR switch B.

In embodiments, configuring the interconnect fabric to implement a plurality of independent spine switch planes comprises segmenting each top-of rack switch in the plurality of top-of-rack switches into a plurality of logical switches; in such embodiments, each top-of-rack switch comprises a logical switch segment associated with each independent spine switch plane. In the embodiments of FIG. 2, TOR switch A is segmented into four logical switch segments, namely logical switch segment 1, logical switch segment 2, logical switch segment 3 and logical switch segment 4. In the embodiments of FIG. 2, TOR switch B is also segmented into four logical switch segments, namely logical switch segment 1, logical switch segment 2, logical switch segment 3 and logical switch segment 4. Further embodiments may comprise more than one TOR switch per rack. For example, embodiments may comprise two TOR switches per rack; in such embodiments, two logical switch segments (for example logical switch segments 1 and 2) could be configured on one TOR switch (for example TOR switch A) and another two logical switch segments (for example logical switch segments 3 and 4) could be configured on another TOR switch (for example TOR switch B). Still further embodiments may for example 4 TOR switches per rack.

Logical switch segment 1 on TOR switch A and logical switch segment 1 on TOR switch B are both associated with the same independent spine switch plane and spine switch, in this case spine switch 1. Logical switch segment 2 on TOR switch A and logical switch segment 2 on TOR switch B are both associated with the same independent spine switch plane and spine switch, in this case spine switch 2. Logical switch segment 3 on TOR switch A and logical switch segment 3 on TOR switch B are both associated with the same independent spine switch plane and spine switch, in this case spine switch 3. Logical switch segment 4 on TOR switch A and logical switch segment 4 on TOR switch B are both associated with the same independent spine switch plane and spine switch, in this case spine switch 4.

In embodiments, each logical switch segment on each TOR switch is connected to only one spine switch.

In the embodiments of FIG. 2, a first independent spine switch plane comprises spine switch 1 and logical switch segment 1 of both TOR switch A and TOR switch B. In the embodiments of FIG. 2, a second independent spine switch plane comprises spine switch 2 and logical switch segment 2 of both TOR switch A and TOR switch B. In the embodiments of FIG. 2, a third independent spine switch plane comprises spine switch 3 and logical switch segment 3 of both TOR switch A and TOR switch B. In the embodiments of FIG. 2, a fourth independent spine switch plane comprises spine switch 4 and logical switch segment 4 of both TOR switch A and TOR switch B.

Embodiments comprise segmenting each top-of rack switch in the plurality of top-of-rack switches into a plurality of logical switches by configuring a plurality of port virtual local area networks (VLANs). Other segmenting mechanisms could be employed, for example Multiprotocol Label Switching (MPLS), Pseudo Wire Emulation Edge-to-Edge (PWE3) or Virtual Private LAN Service (VPLS).

In embodiments, configuring the interconnect fabric to implement a plurality of independent spine switch planes comprises, for each top-of rack-switch, connecting the logical switch segment associated with each independent spine switch plane to the spine switch of the respective independent spine switch plane. In the embodiments of FIG. 2, logical switch segment 1 of TOR switch A and logical switch segment 1 of TOR switch B are connected to spine switch 1; see dash-dotted line. In the embodiments of FIG. 2, logical switch segment 2 of TOR switch A and logical switch segment 2 of TOR switch B are connected to spine switch 2; see dotted line. In the embodiments of FIG. 2, logical switch segment 3 of TOR switch A and logical switch segment 3 of TOR switch B are connected to spine switch 3; see solid line. In the embodiments of FIG. 2, logical switch segment 4 of TOR switch A and logical switch segment 4 of TOR switch B are connected to spine switch 4; see dashed line.

In embodiments, configuring the interconnect fabric to implement a plurality of independent spine switch planes comprises segmenting each top-of rack switch in the plurality of top-of-rack switches into a plurality of logical switches, and connecting each compute server in the plurality of compute servers to each logical switch segment of a given one of the top-of-rack switches in the plurality of top-of rack switches. In the embodiments of FIG. 2, compute server 1 is connected to each of logical switch segment 1, logical switch segment 2, logical switch segment 3 and logical switch segment 4 of TOR switch A. In the embodiments of FIG. 2, compute server 2 is connected to each of logical switch segment 1, logical switch segment 2, logical switch segment 3 and logical switch segment 4 of TOR switch A. In the embodiments of FIG. 2, compute server 3 is connected to each of logical switch segment 1, logical switch segment 2, logical switch segment 3 and logical switch segment 4 of TOR switch B. In the embodiments of FIG. 2, compute server 4 is connected to each of logical switch segment 1, logical switch segment 2, logical switch segment 3 and logical switch segment 4 of TOR switch B.

In embodiments, at least one compute server in the plurality of compute servers is connected to the same given one of the top-of-rack switches as at least one other compute server in the plurality of compute servers. In embodiments, at least one compute server in the plurality of compute servers is connected to a different given one of the top-of-rack switches from at least one other compute server in the plurality of compute servers. In the embodiments of FIG. 2, both compute server 1 and computer server 2 are connected to TOR switch A, but not TOR switch B. In the embodiments of FIG. 2, both compute server 3 and computer server 4 are connected to TOR switch B, but not TOR switch A.

In embodiments, configuring the interconnect fabric to implement a plurality of independent spine switch planes comprises configuring a first independent spine switch plane comprising a first spine switch in the plurality of spine switches and a second independent spine switch plane comprising a second spine switch in the plurality of spine switches. The first spine switch is connected to a first logical switch segment in each top-of-rack switch in the plurality of top-of-rack switches and each compute server in the plurality of compute servers is connected to the first logical switch segment in each top-of-rack switch in the plurality of top-of-rack switches. The second spine switch is connected to a second logical segment in each top-of-rack switch in the plurality of top-of-rack switches and each compute server in the plurality of compute servers is connected to the second logical segment in each top-of-rack switch in the plurality of top-of-rack switches. In such embodiments, the first logical segment is different to the second logical segment.

In the embodiments of FIG. 2, the first independent spine switch plane could for example comprise the independent spine switch plane formed by spine switch 1, the (dash-dotted line) connections to logical switch segment 1 of TOR switch A and TOR switch B and the (dash-dotted line) connections to each of compute servers 1 to 4. In the embodiments of FIG. 2, the second independent spine switch plane could for example comprise the independent spine switch plane formed by spine switch 2, the (dotted line) connections to logical switch segment 2 of TOR switch A and TOR switch B and the (dotted line) connections to each of compute servers 1 to 4. Similarly, third and fourth independent spine switch planes are formed by spine switches 3 and 4 respectively as well as the respective (solid line and dashed line) connections to logical switch segments 3 and 4 of TOR switches A and B.

In embodiments, the number of logical switch segments in each top-of-rack switch is equal to the number of spine switches in the plurality of spine switches. The embodiments of FIG. 2 comprise a total of four spine switches and a total of four logical segments (in each of TOR switches A and B).

Embodiments make use of Layer 2 networking (for example basic Ethernet switching) in the interconnect fabric.

Embodiments of the present disclosure comprise configuring the Layer 2 networking comprises configuring one or more of Ethernet protocol switching, Virtual Private Local Area Network Service (VPLS) and Ethernet Virtual Private Local Area Network (E-LAN) within each independent spine switch plane in the plurality of independent spine switch planes.

In embodiments, configuring the interconnect fabric to implement a plurality of independent spine switch planes comprises configuring equal-cost multi-path routing (ECMP) load balancing to distribute traffic between compute servers in the plurality of compute servers.

In embodiments, configuring the interconnect fabric to implement a plurality of independent spine switch planes comprises configuring ECMP load balancing across multiple Layer 2 fabrics. In some such embodiments, configuring the interconnect fabric to implement a plurality of independent spine switch planes comprises configuring ECMP load balancing across a plurality of Layer 2 fabrics, with a different Layer 2 fabric being associated with each independent spine switch plane in the plurality of independent spine switch planes.

In embodiments, each independent spine switch plane in the plurality of independent spine switch planes comprises an independent Layer 2 fabric. In embodiments, each independent spine switch plane in the plurality of independent spine switch planes comprises a different Layer 2 fabric which is separate from each of the other independent spine switch planes in the plurality of independent spine switch planes.

In embodiments, configuring the interconnect fabric to implement a plurality of independent spine switch planes comprises configuring Layer 3 routing between compute servers in the plurality of compute servers. The term 'Layer 3' here refers to the network layer of the OSI model.

Embodiments comprise an Internet Protocol (IP) routed fabric. In embodiments, ECMP is employed to distribute traffic across multiple links (for example instead of using Ethernet techniques such as MLAG). By leveraging ECMP load balancing on the compute servers, it is possible to build the fabric out of multiple independent leaf/spine switch planes using Layer 3 (for example IP) routing in the compute server nodes and Layer 2 (for example basic Ethernet switching) in the interconnect fabric. The independent spine switch planes are configured to operate completely independently. In embodiments, the independent spine switch planes are configured such that they do not share a fault domain. In embodiments, the independent spine switch planes are configured such that they are loop free. These features allow for the catastrophic failure of one (or more) plane(s) of Ethernet interconnect fabric without the loss of the pod (the failure would just decrease the amount of interconnect bandwidth in the pod). This is a gentler failure mode than the pod-wide IP or Ethernet failure that is possible with known designs.

In embodiments, configuring the interconnect fabric to implement a plurality of independent spine switch planes comprises configuring each independent spine switch plane as an Ethernet network which is isolated from each of the other independent spine switch planes. In some such embodiments, each isolated Ethernet network hosts a different IP subnet.

In embodiments, each independent spine switch plane comprises an isolated Ethernet network (hosting an IP subnet), so a first independent spine switch plane's subnet could for example be 2001:db8:0:1::/64, a second independent spine switch plane's subnet could for example be 2001:db8:0:2::/64, a third independent spine switch plane's subnet could for example be 2001:db8:0:3::/64, and a fourth independent spine switch plane's subnet could for example be 2001:db8:0:4::/64.

In embodiments, data center network 200 comprises a plurality of Border Gateway Protocol (BGP) route reflectors; in such embodiments, configuring the interconnect fabric to implement a plurality of independent spine switch planes comprises configuring at least one BGP route reflector from the plurality of BGP route reflectors in each independent spine switch plane.

In embodiments, configuring the interconnect fabric to implement a plurality of independent spine switch planes comprises configuring at least two BGP route reflectors from the plurality of BGP route reflectors in each independent spine switch plane. In some such embodiments, configuring the interconnect fabric to implement a plurality of independent spine switch planes comprises configuring each of the at least two BGP route reflectors in each independent spine switch plane to be peers of each other.

In embodiments, each independent spine switch plane comprises a mesh of route reflectors.

In embodiments, configuring the interconnect fabric to implement a plurality of independent spine switch planes comprises configuring each compute server in the plurality of compute servers to be a BGP route reflector client of at least one BGP route reflector in each independent spine switch plane.

In embodiments, each independent spine switch plane has its own BGP route reflectors. In embodiments, the route reflectors are peered with each other within each independent spine switch plane, but the route reflectors in different independent spine switch planes are not peered with one another. Therefore, in embodiments, a data center fabric of four independent spine switch planes would have four route reflector meshes. In embodiments, each compute server, border router, etc. is configured to be a route reflector client of at least one route reflector in each independent spine switch plane. In embodiments, each compute server, border router, etc. is configured to be a route reflector client of at least two route reflectors in each independent spine switch plane. In embodiments, one or more of the route reflectors are physical route reflectors. In embodiments, one or more of the route reflectors are virtual route reflectors. Embodiments could comprise a mixture of physical and virtual route reflectors.

In embodiments, one or more of the route reflectors comprise dedicated hardware connected to the spine switches (or the spine switches themselves). In embodiments, one or more of the route reflectors comprise physical or virtual route reflectors connected to the necessary logical leaf switch segments (for example logical switch segment 1, logical switch segment 2, logical switch segment 3 and logical switch segment 4).

In embodiments, a given route reflector runs on a compute server and is connected directly to the appropriate plane link, and is not routed through a virtual router.

In embodiments, one or more of the compute hosts comprise routers and/or routing functionality. In embodiments, such routers are configured to synergize with the multiple independent Layer 2 planes by configuring a logical interface into each plane and using ECMP to distribute traffic across them. In embodiments, the routing is configured such that each compute host sees for each destination a route per Layer 2 plane. In embodiments, this is accomplished by setting up a route reflector in each plane and having each compute host peer with each route reflector. In embodiments, each compute server has an address on the subnet of each plane, and announces its end points on each subnet. In some embodiments where ECMP is enabled, the compute servers distribute the load across some or all of the planes.

By use of embodiments, if a given plane fails (for example due to a spanning tree failure), then only that given plane would fail. The remaining planes in the plurality of planes would stay running.

Embodiments make a whole swath of MLAG (and other competing vendor protocols) hardware/software unnecessary because embodiments provide an improved solution with cheap, well understood hardware and/or Ethernet control protocols.

The above embodiments are to be understood as illustrative examples of the present disclosure. Further embodiments of the present disclosure are envisaged.

In embodiments, one or more of VPLS or E-LAN is employed instead of (or in addition to) traditional Ethernet as the networking transport in the interconnect fabric.

One or more of the aspects of the embodiments described herein with reference to the drawings comprise processes performed by one or more entities such as switches, network nodes, servers, etc. In embodiments, the one or more entities comprise one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device; etc. Memory, as referred to above may comprise any suitable storage medium, including solid-state drives (SSD) or other semiconductor-based RAM; a ROM, for example a CD ROM or a semiconductor ROM; or a magnetic recording medium, for example a floppy disk or hard disk.

Embodiments described above show some example physical and/or logical configurations. Embodiments comprise other physical and logical configurations and counts of the various entities/elements/components.

Embodiments could employ multiple physical links and multiple TOR switches (for example four physical links and two TOR switches, meaning that each TOR would have two logical switches). In embodiments, any mix of n physical links and m logical (VLAN or the like) links where n+m=s, where s is the number of spine switches could be employed. Similarly, in embodiments, any number of n physical and/or m logical switches where n+m=p, where p is the number of independent spine switch planes, could be employed.

A physical link may for example comprise a cable connection between two switches. Such a physical link could carry multiple logical links, for example separated by VLAN tags or the like (although in some embodiments, a dedicated physical link carrying only traffic for one plane is employed in order to maximize bandwidth). Logical links require further configuration to get to the appropriate spine switch (since a physical cable carrying links will in general only plug into one switch), but this can be achieved by employing appropriate forwarding rules. In alternative embodiments, a spine switch is configured/connected to operate as multiple logical spine switches.

Whilst a logical link emulates a separate cable connection between switches, a logical switch emulates a separate physical switch sitting in the TOR position. In practice, this is a likely use of logical components as a TOR switch is unlikely to be a bottleneck (because its capacity may well exceed that of the servers it is connected to), and so splitting it into multiple logical switches may be more cost effective than installing multiple physical switches.

In embodiments, configuring the logical switch segments is carried out by firmware or software. In some such embodiments, configuring logical switch segments comprises assigning different physical ports on the respective top-of-rack switch to the different logical switch segments (so for example ports 1-5 comprise logical switch segment 1, ports 6-10 comprise logical switch segment 2, etc.). In embodiments, the logical switch segments are cabled up as if they were different physical switches, even though the cables end up plugging into the same physical switch 'box'.

In embodiments, each top-of-rack switch is logically sub-divided into a plurality of logical switch segments and there are dedicated links from each logical switch segment to each spine switch. In embodiments, the link to each compute server comprises a single cable to save on costs, which could then have multiple logical links run on it connecting the compute server to each logical switch segment.

The embodiments of FIG. 2 comprise a 3-stage Clos network. Alternative embodiments comprise an n stage Clos network, where n>2 and is an odd integer (for example, or other valid cls/leaf-spine architectures).

Some embodiments comprise physical links from physical spine switches to different ports on a TOR switch split into a number of virtual TOR switches. In some such embodiments, each TOR switch is split (or 'segmented') into a number of virtual switches; in such embodiments, the connection to each host comprises a single physical connection split into logical connections by VLANs. In other embodiments, the physical links are split using one or more of MPLS, PWE3 and VPLS. Other 'hybrid' embodiments with n independent spine switch planes, comprise one or more of n physical links going into 1 TOR switch, n/2 physical links going into each of 2 TOR switches, n VLANs on one physical link going into 1 TOR, n/2 VLANs on each of two physical links going into 2 TOR switches (or 1 TOR switch).

In some embodiments, Media Access Control-VLAN is employed to split one or more physical links into a number of logical links.

In some embodiments, one or more TOR switches are split into a number of virtual switches; in some such embodiments, the connection to each host comprises a single physical which is split into a number of logical connections by VLANs or suchlike.

Some embodiments comprise physical links from physical spine switches to different ports on a TOR switch split into virtual TOR switches, and a single physical link to each host.

Some embodiments comprise one physical link between each server and a single TOR switch, with n VLANs on that physical link (where n is equal to the number of spine switches.

Some embodiments comprise M physical links between each server and a single TOR switch, those links in a Link Aggregation (LAG), and the n VLANs on the LAG.

Some embodiments comprise two physical links between each server, one link to each of two TOR switches and n/2 VLANs on each link.

Some embodiments comprise M physical links on each server, with M/2 links homed to each of two TOR switches, each M/2 link being linked together using LAG, and n/2 VLANs per LAG group.

Embodiments comprises a system for use in operating a data center network, the data center network comprising an interconnect fabric comprising:
 a plurality of spine switches;
 a plurality of top-of-rack switches; and
 a plurality of compute servers,
 the system comprising at least one memory including computer program code; and
 at least one processor in data communication with the at least one memory, wherein the at least one processor is configured to implement a plurality of independent spine switch planes, wherein each spine switch plane in the plurality of independent spine switch planes comprises a different spine switch in the plurality of spine switches,
 wherein the configured interconnect fabric comprises a physical connection from each spine switch in the plurality of spine switches to each top-of-rack-switch in the plurality of top-of-rack-switches, wherein the configuring comprises segmenting each top-of rack switch in the plurality of top-of-rack switches into a plurality of virtual local area networks (VLANs), each VLAN in the plurality of VLANs being associated with a different independent spine switch plane, wherein the configured interconnect fabric comprises a physical connection from each compute server in the plurality of compute servers to a single top-of-rack-switch in the plurality of top-of-rack-switches, the physical connection from a respective computer server to a respective single top-of-rack-switch being configured to connect logically to each VLAN configured on the respective single top-of-rack switch, and wherein the configuring comprises configuring Layer 2 networking within each independent spine switch plane in the plurality of independent spine switch planes.

Embodiments comprise other interconnect topologies, for example an N-dimensional hypercube or torus; in some such embodiments, any one link carries the same plane(s) of traffic.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A system for use in operating a data center network, the data center network comprising an interconnect fabric comprising a plurality of spine switches, a plurality of top-of-rack switches, and a plurality of compute servers, the system comprising:
    at least one memory including computer program code; and
    at least one processor in data communication with the at least one memory, wherein the at least one processor is configured to implement a plurality of independent spine switch planes, wherein each spine switch plane in the plurality of independent spine switch planes comprises a different spine switch in the plurality of spine switches, wherein to implement the plurality of independent spine switch planes includes:
        configuring Layer 2 networking within each independent spine switch plane in the plurality of independent spine switch planes; and
        segmenting a top-of-rack switch of the plurality of top-of-rack switches into a plurality of logical switches, wherein a number of the plurality of logical switches is equal to a number of the plurality of spine switches, wherein a logical switch of the plurality of logical switches is directly connected to a corresponding spine switch of the plurality of spine switches.

2. The system of claim 1, wherein the interconnect fabric is configured to implement the plurality of independent spine switch planes at least in part by connecting a spine switch of each independent spine switch plane to each top-of-rack switch in the plurality of top-of rack switches.

3. The system of claim 1, wherein segmenting the top-of rack switch of the plurality of top-of-rack switches into the plurality of logical switches is carried out by configuring a plurality of port virtual local area networks (VLANs).

4. The system of claim 1, wherein the interconnect fabric is configured to implement the plurality of independent spine switch planes at least in part by
    connecting each compute server in the plurality of compute servers to each logical switch segment of a given one of the top-of-rack switches in the plurality of top-of rack switches.

5. The system of claim 4, wherein at least one compute server in the plurality of compute servers is connected to the same given one of the top-of-rack switches as at least one other compute server in the plurality of compute servers, and
    wherein the at least one compute server in the plurality of compute servers is connected to a different top-of-rack switch switches than at least one other compute server in the plurality of compute servers.

6. The system of claim 1, wherein the interconnect fabric is configured to implement the plurality of independent spine switch planes at least in part by:
    configuring a first independent spine switch plane comprising a first spine switch in the plurality of spine switches, wherein the first spine switch is connected to a first logical switch segment in each top-of-rack switch in the plurality of top-of-rack switches, wherein each compute server in the plurality of compute servers is connected to the first logical switch segment in each top-of-rack switch in the plurality of top-of-rack switches; and
    configuring a second independent spine switch plane comprising a second spine switch in the plurality of spine switches, wherein the second spine switch is connected to a second logical segment in each top-of-rack switch in the plurality of top-of-rack switches, wherein each compute server in the plurality of compute servers is connected to the second logical segment in each top-of-rack switch in the plurality of top-of-rack switches,
    wherein the first logical segment is different than the second logical segment.

7. The system of claim 1, wherein configuring the Layer 2 networking comprises configuring one or more of Ethernet protocol switching, Virtual Private Local Area Network Service (VPLS) and Ethernet Virtual Private Local Area Network (E-LAN) within each independent spine switch plane in the plurality of independent spine switch planes.

8. The system of claim 1, wherein the interconnect fabric is configured to implement the plurality of independent spine switch planes at least in part by configuring each independent spine switch plane as an Ethernet network which is isolated from each of the other independent spine switch planes.

9. The system of claim 8, wherein each isolated Ethernet network hosts a different Internet Protocol (IP) subnet.

10. The system of claim 1, wherein the data center network comprises a plurality of Border Gateway Protocol (BGP) route reflectors, and
    wherein the interconnect fabric is configured to implement the plurality of independent spine switch planes at least in part by configuring at least one BGP route reflector from the plurality of BGP route reflectors in each independent spine switch plane.

11. The system of claim 10, wherein the interconnect fabric is configured to implement the plurality of independent spine switch planes at least in part by configuring at least two BGP route reflectors from the plurality of BGP route reflectors in each independent spine switch plane.

12. The system of claim 11, wherein the interconnect fabric is configured to implement the plurality of independent spine switch planes at least in part by configuring each of the at least two BGP route reflectors to be peers of each other.

13. The system of claim 10, wherein the interconnect fabric is configured to implement the plurality of independent spine switch planes at least in part by configuring each compute server in the plurality of compute servers to be a BGP route reflector client of at least one BGP route reflector in each independent spine switch plane.

14. The system of claim 1, wherein the interconnect fabric is configured to implement the plurality of independent spine switch planes at least in part by configuring Layer 3 routing between compute servers in the plurality of compute servers.

15. The system of claim 1, wherein the interconnect fabric is configured to implement the plurality of independent spine switch planes at least in part by configuring equal-cost multi-path routing (ECMP) load balancing to distribute traffic between compute servers in the plurality of compute servers.

16. A method for use in operating a data center network, the data center network comprising an interconnect fabric comprising a plurality of spine switches, a plurality of top-of-rack switches, and a plurality of compute servers, the method comprising:
configuring the interconnect fabric to implement a plurality of independent spine switch planes, wherein each spine switch plane in the plurality of independent spine switch planes comprises a different spine switch in the plurality of spine switches, wherein to implement the plurality of independent spine switch planes includes:
configuring Layer 2 networking within each independent spine switch plane in the plurality of independent spine switch planes; and
segmenting a top-of-rack switch of the plurality of top-of-rack switches into a plurality of logical switches, wherein a number of the plurality of logical switches is equal to a number of the plurality of spine switches, wherein a logical switch of the plurality of logical switches is directly connected to a corresponding spine switch of the plurality of spine switches.

17. A non-transitory computer-readable storage medium comprising computer-executable instructions which, when executed by a processor, cause a computing device to perform a method for use in operating a data center network, the data center network comprising an interconnect fabric comprising, plurality of spine switches, a plurality of top-of-rack switches, and a plurality of compute servers, the method comprising:
configuring the interconnect fabric to implement a plurality of independent spine switch planes, wherein each spine switch plane in the plurality of independent spine switch planes comprises a different spine switch in the plurality of spine switches, wherein to implement the plurality of independent spine switch planes includes:
configuring Layer 2 networking within each independent spine switch plane in the plurality of independent spine switch planes; and
segmenting a top-of-rack switch of the plurality of top-of-rack switches into a plurality of logical switches, wherein a number of the plurality of logical switches is equal to a number of the plurality of spine switches, wherein a logical switch of the plurality of logical switches is directly connected to a corresponding spine switch of the plurality of spine switches.

18. A system for use in operating a data center network, the data center network comprising an interconnect fabric comprising a plurality of spine switches, a plurality of top-of-rack switches, and a plurality of compute servers, the system comprising:
at least one memory including computer program code; and
at least one processor in data communication with the at least one memory, wherein the at least one processor is configured to implement a plurality of independent spine switch planes, wherein each spine switch plane in the plurality of independent spine switch planes comprises a different spine switch in the plurality of spine switches, wherein the configured interconnect fabric comprises a physical connection from each spine switch in the plurality of spine switches to each top-of-rack-switch in the plurality of top-of-rack-switches, wherein to implement the plurality of independent spine switches includes:
segmenting each top-of rack switch in the plurality of top-of-rack switches into a plurality of virtual local area networks (VLANs), each VLAN in the plurality of VLANs being associated with a different independent spine switch plane, wherein the configured interconnect fabric comprises a physical connection from each compute server in the plurality of compute servers to a single top-of-rack-switch in the plurality of top-of-rack-switches, the physical connection from a respective computer server to a respective single top-of-rack-switch being configured to connect logically to each VLAN configured on the respective single top-of-rack switch,
configuring Layer 2 networking within each independent spine switch plane in the plurality of independent spine switch planes; and
segmenting a top-of-rack switch of the plurality of top-of-rack switches into a plurality of logical switches, wherein a number of the plurality of logical switches is equal to a number of the plurality of spine switches, wherein a logical switch of the plurality of logical switches is directly connected to a corresponding spine switch of the plurality of spine switches.

* * * * *

UNITED STATES PATENT AND TRADEMARK OFFICE
CERTIFICATE OF CORRECTION

PATENT NO. : 9,813,302 B2  Page 1 of 1
APPLICATION NO. : 14/838928
DATED : November 7, 2017
INVENTOR(S) : Curtis et al.

It is certified that error appears in the above-identified patent and that said Letters Patent is hereby corrected as shown below:

In the Specification

In Column 1 Line 14 after "Charles" delete "Cls" and insert --Clos-- therefor.

In Column 10 Line 7 after "valid" delete "Cls" and insert --Clos-- therefor.

Signed and Sealed this
Tenth Day of April, 2018

Andrei Iancu
*Director of the United States Patent and Trademark Office*